United States Patent
Nakajima et al.

(10) Patent No.: US 7,611,410 B2
(45) Date of Patent: Nov. 3, 2009

(54) SCORE VERIFICATION SYSTEM AND SCORE VERIFICATION METHOD OF ONLINE GAME

(75) Inventors: Satoshi Nakajima, Tokyo (JP); Tadashi Tsushima, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 313 days.

(21) Appl. No.: 11/427,012

(22) Filed: Jun. 28, 2006

(65) Prior Publication Data

US 2007/0004507 A1 Jan. 4, 2007

(30) Foreign Application Priority Data

Jun. 30, 2005 (JP) ............................. P2005-192858

(51) Int. Cl.
*A63F 9/24* (2006.01)
(52) U.S. Cl. .......................................... 463/29; 463/43
(58) Field of Classification Search ................... 463/29
See application file for complete search history.

(56) References Cited

U.S. PATENT DOCUMENTS

| | | | | |
|---|---|---|---|---|
| 6,336,865 B1 * | 1/2002 | Kinjo | ........................... | 463/34 |
| 6,863,608 B1 * | 3/2005 | LeMay et al. | .................. | 463/24 |
| 6,986,712 B1 * | 1/2006 | Ogawa | ........................ | 463/42 |
| 7,288,027 B2 * | 10/2007 | Overton | ....................... | 463/42 |
| 2002/0103019 A1 | 8/2002 | Emmerson | | |
| 2004/0002384 A1 | 1/2004 | Multerer et al. | | |
| 2004/0224741 A1 | 11/2004 | Jen et al. | | |
| 2004/0242325 A1 | 12/2004 | Levitan et al. | | |

FOREIGN PATENT DOCUMENTS

| | | |
|---|---|---|
| EP | 1475134 | 11/2004 |
| JP | 2000-070546 | 3/2000 |
| JP | 2000-070546 | * 7/2000 |
| JP | 2001-000744 | 1/2001 |
| JP | 2001-526550 | 12/2001 |
| JP | 2002-163062 | 6/2002 |
| JP | 2002-355445 | 12/2002 |
| JP | 2004-065956 | 3/2004 |

(Continued)

OTHER PUBLICATIONS

English language Abstract of JP 2002-163062.

(Continued)

*Primary Examiner*—Xuan M. Thai
*Assistant Examiner*—Kesha Y. Frisby
(74) *Attorney, Agent, or Firm*—Greenblum & Bernstein, P.L.C.

(57) ABSTRACT

A score verification system for verifying that a score of a player having played an online game is a true score of the player. A player terminal receives a game program from an online game server, and the game is played on the player terminal. Plural players execute the same online game, and compete for high score. The score acquired by the player, together with an operation history of the player, is transmitted to the online game server. In the case where the score may be a high score, the same play is reproduced based upon the operation history received by the online game server, and the fairness of the received score is verified based on the score obtained by the reproduction.

4 Claims, 6 Drawing Sheets

FOREIGN PATENT DOCUMENTS

JP    2006-192142    7/2006

OTHER PUBLICATIONS

English language Abstract and partial translation of JP 2001-000744.
English language Abstract and partial translation of JP 2000-070546.
English language Abstract and translation of JP 2006-192142.
English language Abstract of International Publication No. WO 97/19537.
English language Abstract of JP 2004-065956.
English language Abstract of JP 2002-355445.

* cited by examiner

SCORE VERIFICATION SYSTEM AND SCORE VERIFICATION METHOD OF ONLINE GAME

CROSS REFERENCE TO RELATED APPLICATION

The present disclosure relates to subject matter contained in Japanese Patent Application No. 2005-192858, filed on Jun. 30, 2005, the disclosure of which is expressly incorporated herein by reference in its entirety.

BACKGROUND OF THE INVENTION

1. Field of the Invention

The present invention relates to a score verification system and a score verification method for an online game, the system and method verifying that the score of a player who has played an online game is a true score.

2. Description of the Related Art with the wide spread of broadband communication technology in recent years, the use of online games has rapidly grown. Various types of online games have become popular, such as, e.g., competition games where plural players play a match against each other through a network, or games of the type where plural players challenge the same game and compete for high score. In the online games noted above, attempts have been made by unscrupulous individuals, or groups of individuals to unfairly obtain a high score by altering the game through hacking, or the like, or by through falsification of the high score. In order to allow players to enjoy a game by allowing them to compete for high score under fair conditions, it is desirable to prevent such unfair acts.

In an attempt to address the above problem, Unexamined Japanese Patent Publication No. 2002-355445 teaches, for example, a system in which the result of a game is encrypted and is transmitted to a game server in order to prevent the falsification of a score. In addition, Unexamined Japanese Patent Publication No. 2004-65956 teaches a system where at the time of transmission/reception of a game session, an encryption key is transmitted/received in order to prevent alterations from being made by another device on a network.

The foregoing methods for preventing the alteration of a score, or the alteration of the game, have as their main object to prevent attack by hacking or the like from another device on a network. Thus, there is a problem that, for example, if reverse engineering is performed in a terminal operated by a player, and if thereby the player found a method of transmitting a score altered by some method to a server, it is impossible to verify that the score has been altered.

That is, only a countermeasure to ensure that a score is safely transmitted to a server from a player terminal is insufficient to prevent an unfair act. Instead, a countermeasure to ensure that the score itself to be transmitted to the server is a true score obtained from the result of operation of a game actually executed by the player should be the score taken as the actual score.

SUMMARY OF THE INVENTION

The invention addresses the problem stated above, and provides a score verification system and a score verification method for an online game, for verifying that a score of a player having played an online game is an unaltered score obtained fairly through the play of the game by the player.

According to a first aspect of the invention, there is provided a score verification system for preventing falsification of a score in an online game. The score verification system includes a game program storage unit that stores a game program of an online game with identification information attached thereto for identifying the game program.

The score verification system further includes a game transmitter that transmits the game program to a player terminal (also known as a user terminal) for playing the online game.

The score verification system further includes a game result receiver that receives information relating to a game result including at least the identification information, a first score being computed based on an operation of the game program performed by a player, and an operation history of operation commands of the player.

The score verification system further includes a score calculation unit that reads the game program corresponding to the identification information from the game program storage unit, executes the operation commands in accordance with the operation history to reproduce the operation of the player, and thereby computes a second score.

The score verification system further includes a score verification unit that compares the first score with the second score to verify whether the first score is a true, unaltered score.

In the score verification system, the game program includes a function for recording operation commands of the player to ensure that a same score may later be reproduced using a same operation command.

According to an aspect of the invention, the play executed in the player terminal is reproduced based on operation history transmitted from the player terminal. The score obtained from the result of the reproduction is compared with the score transmitted from the player terminal to verify that the score transmitted from the player terminal is the true, unaltered score obtained from the operation result of the player.

According to an aspect of the invention, the way of adding the identification information of the game program is not particularly limited. In the case where the score is verified in a game where players compete for high score, it may be necessary that the game program identification information identify each identical game for each player. Accordingly, in the case where a specific game instance of a certain game is made an object and the competition for high score is carried out, it is necessary that the identification information identify not only a game title but also a corresponding game instance.

In addition, in the operation history, information relating to a frame displayed on the player terminal (also known as user terminal) when the player terminal receives an operation command is recorded. When the frame recorded in the operation history is displayed, the score calculation unit reproduces the operation command corresponding to the frame.

When the operation history is collected using an absolute time from a start of the game, or the like, the play may not be accurately reproduced because of a difference in processing power of a computer, for example. When the structure as stated above is implemented, since the operation timing of the player is normalized based upon the frame displayed, the play can be accurately reproduced even in different computers.

Furthermore, according to an aspect of the invention, in the operation history, information relating to a time instant when the player terminal receives the operation command is recorded with reference to a frame displayed by the game program. The score calculation unit reproduces the operation of the player in accordance with the information recorded in the operation history.

Also, since the operation timing of the player is normalized based upon the frame displayed, the play can be accurately reproduced even in different computers. Moreover, in addition to a frame in which an operation is performed, a time indicating that an operation is performed in terms of seconds, for example, from the time at which the frame was displayed is reflected, e.g., the beginning of the frame, and therefore, more accurate reproduction can be performed.

The score verification system, in an aspect of the invention, includes a high score storage unit that stores information relating to the scores of higher-ranking persons with respect to the game program. The score verification system may still further include a high score judgment unit that compares the first score with the score of higher-ranking persons stored in the high score storage unit to judge/determine whether the first score falls under the category of higher-ranking person. The score verification system may further include a high score update unit that refers to the high score storage unit in a case where the first score is verified to be the true score, and adds the first score to the higher-ranking persons to update the high score storage unit in a case where the first score falls under the category of high score persons. In the score verification system, in the case where the high score judgment unit judges that the first score falls under the category of the higher-ranking person, the score calculation unit calculates the second score.

All scores transmitted from the player terminal are not verified, but only the transmitted score ranked as the high score is selected and verified. When the game is reproduced as to all the scores and the verification is performed, there is a possibility that a processing load required for the server to perform the score verification exceeds the processing capability of the server. When the embodiment of the invention as stated above is applied, it becomes possible to efficiently verify the high score.

Incidentally, the range of the high score is not particularly limited, and the verification is performed with respect to the range set as an object. For example, when players compete for only the first place, a score exceeding the first place is an object of verification, and when players compete for the top ten places, scores ranked within the tenth place are objects of verification.

Furthermore, the invention may be specified as a score verification method of an online game which is executed by a player terminal for playing the online game and an online game server for managing the online game.

According to a second aspect of the invention, there is provided a score verification method for preventing alteration of a score in an online game. The score verification method includes reading, by an online game server that manages the online game, a game program of the online game from a game program storage part that stores the game program of the online game with identification information attached thereto for identifying the game program.

The score verification method further includes transmitting the game program read by the game online server to a player terminal for playing the online game.

The score verification method further includes executing the game program by the player terminal to record an operation history of operation commands of a player.

The score verification method further includes calculating, by the player terminal, a first score by an operation of the player with respect to the game program.

The score verification method further includes, sending information relating to a game result including at least the identification information, the first score, and the operation history from the player terminal to the online game server.

The score verification method further includes receiving the information relating to the game result including at least the identification information, the first score, and the operation history from the player terminal at the online game server.

The score verification method further includes reading, by the online game server, the game program corresponding to the identification information from the game program storage part, executing the operation commands in accordance with the operation history to reproduce the operation of the player to compute a second score.

The score verification method further includes comparing, by the online game server, the first score with the second score to verify whether the first score is a true score.

In the method according to an aspect of the invention, the game program records the operation commands of the player, and computes a same score when a same operation command is reproduced.

In the operation history, information relating to a frame displayed on the player terminal when the player terminal receives the operation command may be recorded. In calculating the second score, when the frame recorded in the operation history is displayed, the corresponding operation command may be reproduced.

In the operation history, the information relating to a time instant when the player terminal receives the operation command may be recorded with reference to the frame displayed by the game program. In calculating the second score, the operation of the player is reproduced in accordance with the information recorded in the operation history.

The score verification method may further include comparing, by the online game server, the first score with scores of higher-ranking persons stored in a high score storage part for storing information relating to the scores of the higher-ranking persons to judge (determine) whether the first score falls under a category of the higher-ranking persons. The score verification method may further include, in a case where it is verified that the first score is the true score, accessing, by the online game server, the high score storage part. The score verification system may further include in a case where the first score falls under the category of the high-ranking persons, adding the first score to the higher-ranking persons to update the high score storage part. In the method according the an aspect of the invention, the second score may be calculated in a case where it is judged that the first score falls under the category of the higher-ranking person.

According to the invention, it is possible to efficiently verify that the score of the player taking part in the online game is not an altered one, but is a fair score obtained from the operation result of the player. As a result, when the online game in which plural players compete for high score is provided, it can be provided as a highly reliable service.

DETAILED DESCRIPTION OF THE INVENTION

The best mode for carrying out the invention will be described below in detail with reference to the drawings. The following explanation is an example of an embodiment of the invention, and the invention is not limited to the embodiment disclosed. It is to be understood that other embodiments may be utilized, and structural and functional changes may be made without departing from the scope and/or spirit of the present disclosure.

Figure 1:
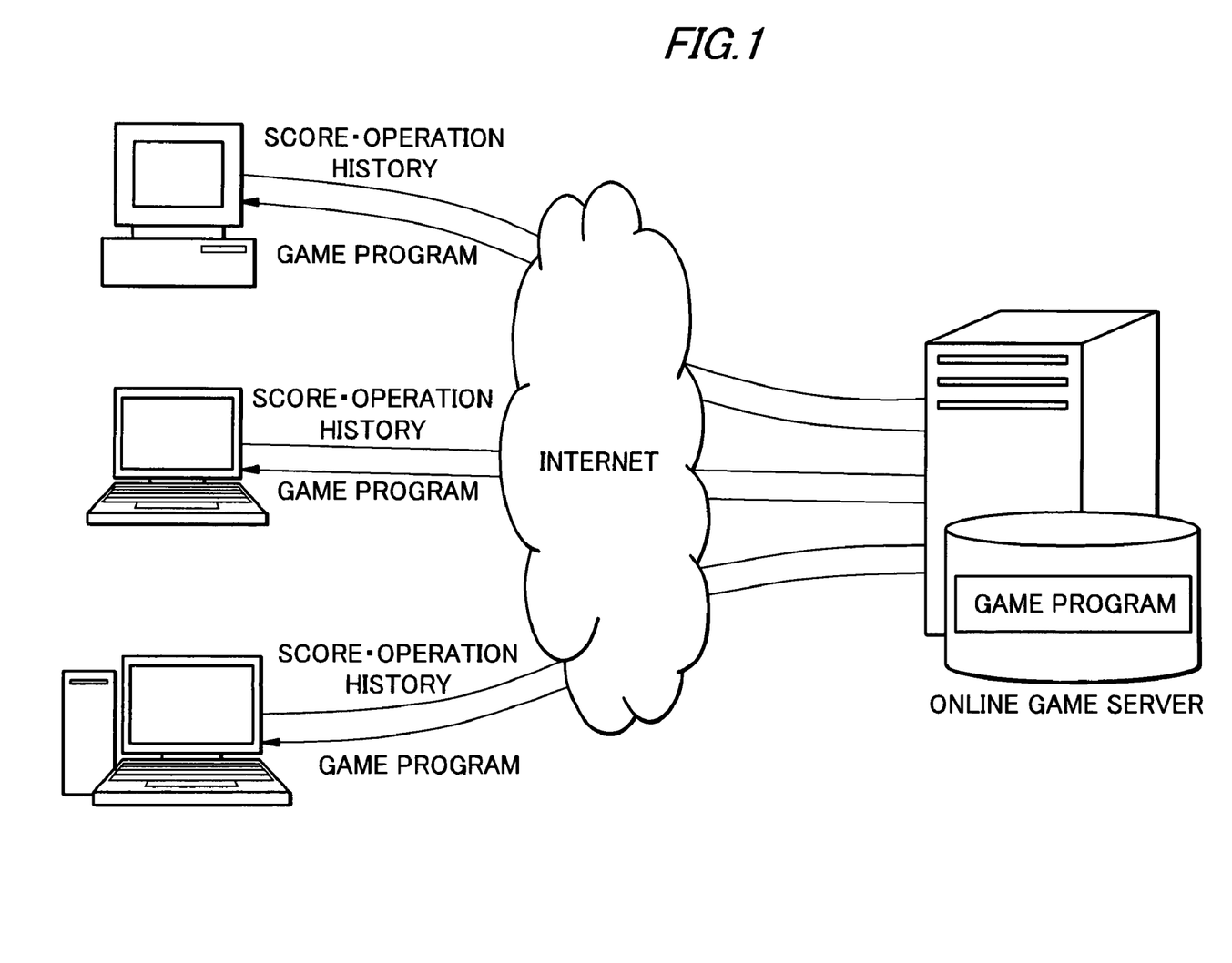
FIG. 1 is a view showing an overview of a score verification system according to an embodiment of the invention.

The outline of an embodiment of the score verification system of the invention will be described with reference to FIG. 1 of the drawings. A terminal operated by a player, or user, may be connected to an online game server through the Internet, for example, and receive a game program from the online game server. It should be noted that the online game server may be connected to the player terminal through, for example, a private network, dial-up connection, wireless, etc. The player, or user, executes the game program on the terminal to play the online game. In an embodiment of the invention, since players compete with one another for high score, it is necessary that the same game program be provided to each of the players, however, the content of the game is not particularly limited.

Each player executes the same game program at each player terminal to play the game. The score acquired from the result of the play is transmitted to the online game server together with a history of operation commands by button or key operations and the like of the player during the execution of the game program.

In the online game server, in the case where the received score falls under the category of high score, the received history of the operation commands is applied to the same game program to reproduce the game played by the player. In the case where the score obtained as a result of the reproduction is the same as the received score, it is verified that the received score is a true, unaltered score.

As a precondition of the verification as stated above, it is necessary that in the game program used in the invention, the same input operation always result in the same score.

For example, in a game program including an element of a random number, a seed random number generator, for example, may be used so that the same random number will be generated when a start is made from the same seed. In this example, the seed of the random number generator is provided in a unified form, and a specific game instance determined by the seed is provided in association with specified contest period. Thus, a game instance determined based upon a different seed each week is provided in the form like "subject of this week", and thereby the competition for high score in one week can be carried out.

However, it is understood that variations to the generation of the random number may be made without departing from the spirit and/or scope of the invention.

Figure 2:
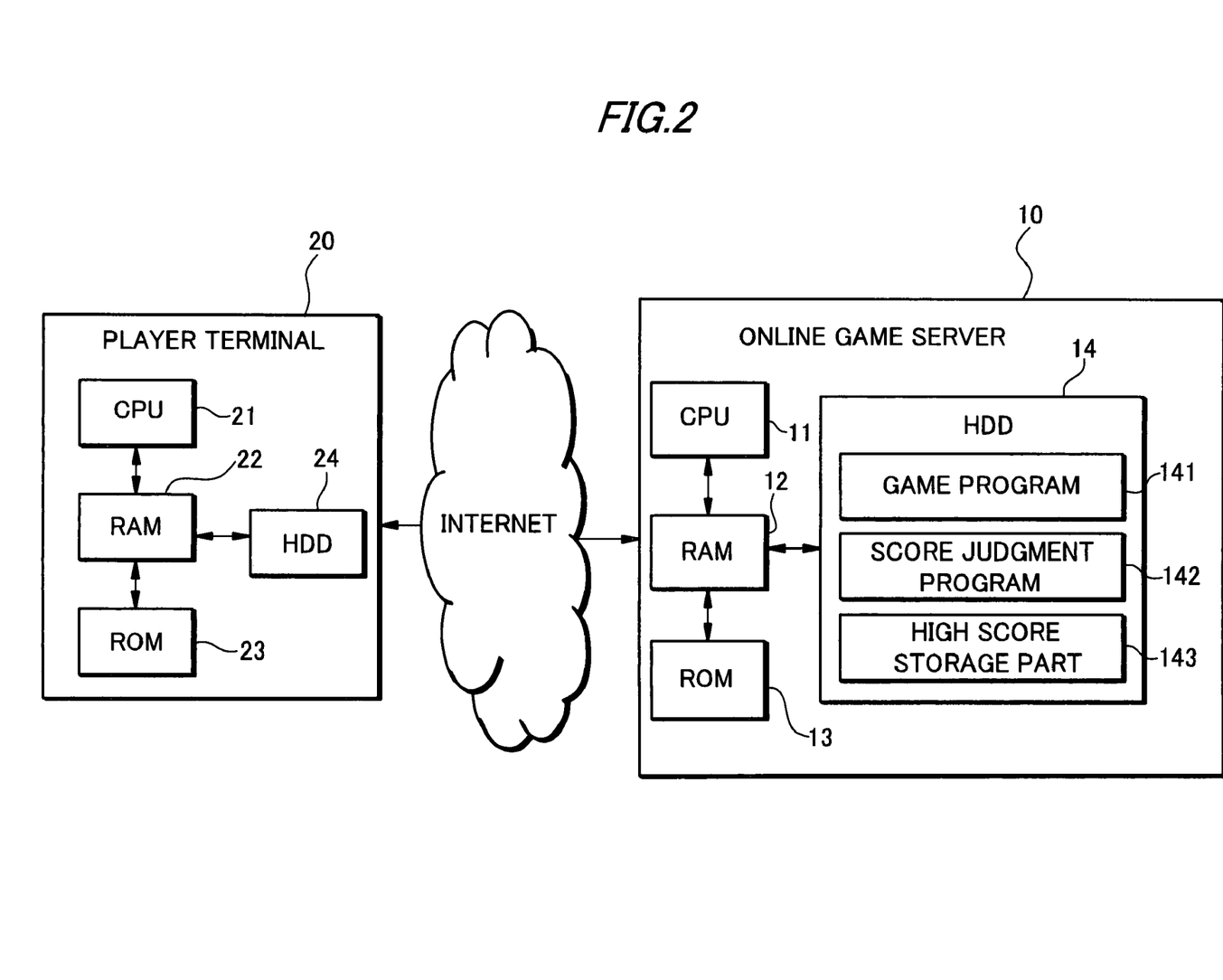
FIG. 2 is a block diagram showing a configuration of an online game server and a player terminal in the score verification system according to an embodiment of the invention.

FIG. 2 shows the structure of the online game server and the player terminal in the score verification system according to an embodiment of the invention. The score verification system according to the embodiment is provided as a partial function of the online game server 10. The online game server 10 includes at least a central processing unit (CPU) 11, a random access memory (RAM) 12, a read only memory (ROM) 13 and a hard drive device (HDD) 14. The HDD 14 may store a game program 141, a score judgment program 142, and a high score storage part 143.

In order that the application program such as the game program 141 or the score judgment program 142, which may be stored in the HDD 14, executes a specified processing, various basic programs for hardware control, such as input/output control, stored in, for example, ROM 13 are initiated. The CPU 11 performs an arithmetic processing while the RAM 12 is made to function as a work area.

On the other hand, a personal computer or a game dedicated machine, for example, may be used as a player terminal 20. The player terminal 20 includes at least a CPU 21, a RAM 22, a ROM 23 and an HDD 24. To play the online game, the player terminal 20 receives the game program 141 from the online game server 10, which may be, but is not limited to, via the Internet. Then, the player terminal 20 executes an arithmetic processing at the CPU 21 while making the RAM 22 to function as a work area of the application program, and thereby executes the game program.

It should be noted that, in general, in the online game, the downloaded game program 141 may not be stored in the HDD 24, but the game program 141 may be executed in the RAM 22 or a virtual memory area of the HDD 24. When the game is over, the game program 141 is erased.

The individual playing the online game selects a desired game using the player terminal 20. The online game server 10 receives a game start request that specifies a game ID of the selected game, or some other mechanism for identifying a specific game, from the player terminal 20. Upon receiving the request, the online game server 10 reads a program corresponding to the specified game ID from the game program 141 stored in the HDD 14, and transmits the game program to the player terminal 20. Incidentally, in the case where the game includes an element of a random number using a seed random number generator, a specific game instance determined by the seed specified in the period is transmitted.

When the player terminal 20 receives the game program 141, the game program 141 is initiated and the game is started. The transmission of the game program 141 is not limited to a single transmission, but may be sequentially called up in accordance with the operation of the player. The game program 141 correlates all operation commands during the game execution with the frames displayed during the operation and records them, and thereby creates an operation history of the player. The created operation history is stored as a temporal file in the RAM 22 or the virtual memory area of the HDD 24, or any other storage device within the scope and/or spirit of the invention. The frame means herein each display screen displayed on the terminal by the game program 141, Unique IDs are attached to all of the frames, that specify the timing of an operation command, such as, for example a time-stamp associated with the operation command.

When the game is over, the game program computes the score acquired by the player through the playing of the game. The score is transmitted to the online game server together with the operation history created in advance and the game ID (including an ID capable of identifying a game instance in the case where a specific game instance is transmitted) for specifying the played game, while the score, history and ID forms a cluster of data.

Upon receiving the score, the operation history, the game ID and the like, the online game server 10 reads the score judgment program 142, and judges whether the received score is a high score. At this time, it is preferable that the information received from the player terminal 20 is stored in a secondary storage device, such as a database, for example. A judgment (determination) as to whether the score falls under the category of high score is made by referring to the high score storage part 143. In the case where the score exceeds the lowest score among the scores stored as high scores in the high score storage part 143, it is judged that the score falls under the category of high score.

In the case where the score is judged to be the high score, in order to verify the legitimacy of the score, the game program 141 is read to reproduce the play of the player by using the previously received operation history. The game program 141 is designed so that the same operation command always leads to the same result. Therefore, in the case where the score obtained by the reproduction is coincident with the score received from the player terminal 20, it is judged that the true score, i.e., based on the play result of the player, has been transmitted. When a true score is determined, the score is recorded as the high score in the high score storage part 143.

In the above embodiment of the invention, it is necessary that the operation history recorded in the player terminal 20 be accurately reproduced at the server so that the entire game, i.e. as played by the player, is accurately reproduced in the online game server 10. However, differences in the execution environment, for example, such as differences in processing abilities of the computer, may cause the reproduced operation command at the server, that is reproduced in accordance with the operation history, to be reproduced at a timing that is different from that of the player's actual play. This situation will be specifically described with reference to FIG. 3 as an example, and a method of preventing this will be described with reference to FIG. 4.

Figure 3:
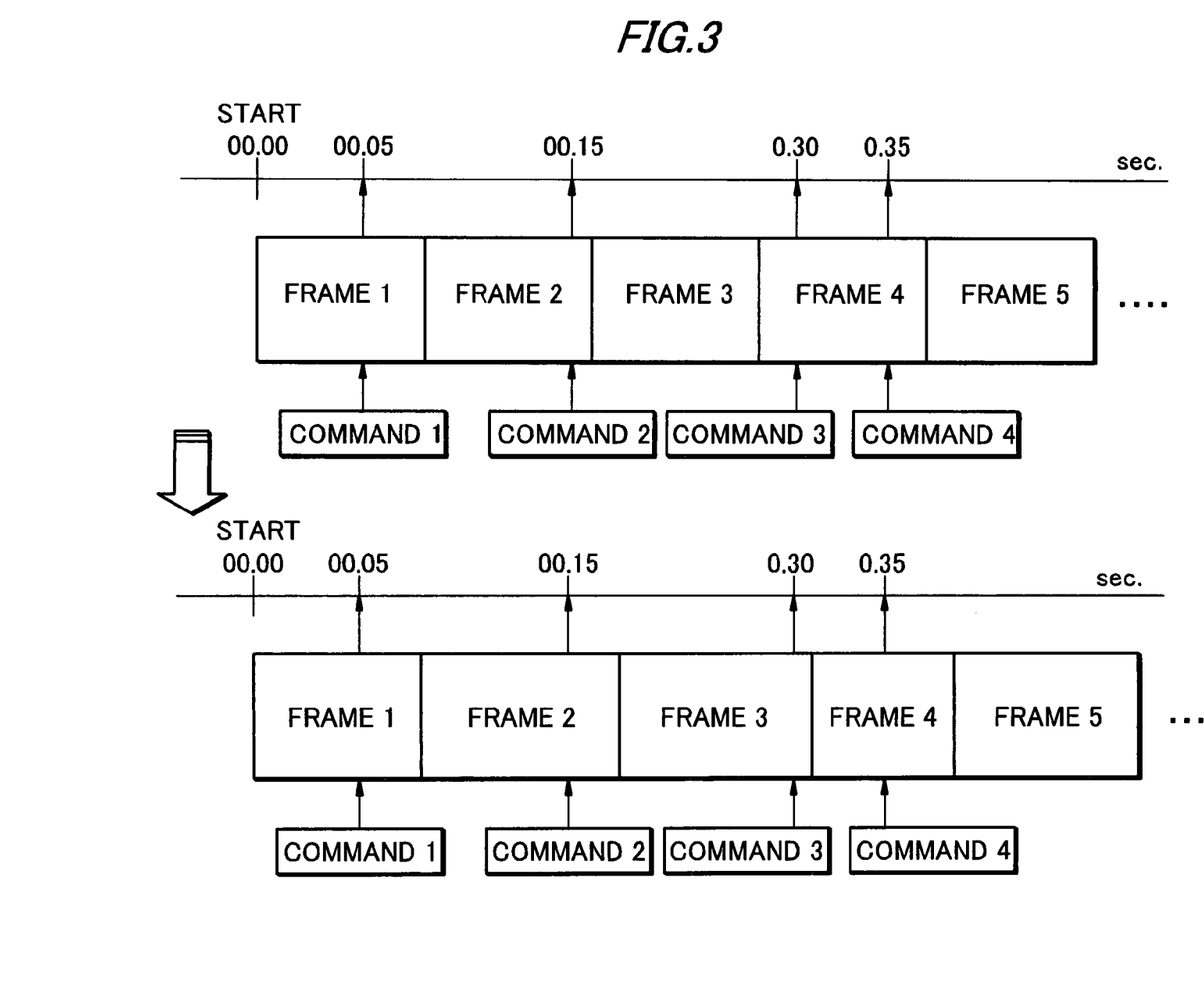
FIG. 3 is a view showing an example where a game is reproduced based upon an operation history in which normalization is not performed and only an absolute time is recorded.

FIG. 3 shows an example in which normalization is not performed with respect to the operation history, and the game is reproduced based upon the operation history, in which only the absolute time of the operation command is recorded. The absolute time, in this example, is measured from the start of the game. The upper view shows a relation between operation commands of the play actually performed in the player terminal 20 and frames displayed. In the example shown in FIG. 3, the game start time is set to 00.00 seconds, command 1 is executed after 00.05 seconds; command 2 is executed after 00.15 seconds; command 3 is executed after 00.30 seconds; and command 4 is executed after 00.35 seconds, and the corresponding frames displayed at these times are frame 1 for command 1, frame 2 for command 2, and frame 4 for commands 3 and 4. As stated above, the operation history is created based upon the absolute time of the operation command.

However, some errors may be observed in the timing of the display of the frames at the online game server 10 because of the execution environment, e.g., such as the processing ability of the computer used in the player terminal 20. The lower view shows a relation between operation commands of the play reproduced by the online game server 10 and frames displayed. The timing when the operation commands are executed is the same as the time of execution in the player terminal 20 since the reproduction is performed on the basis of the absolute time from the game start time. However, with respect to the timing when the frames are displayed, there occurs a case where they are reproduced at a timing different from that in the player terminal 20 because of the difference in processing ability of the computer or the like.

With respect to the correspondence relationship between command 3 and the frames, although command 3 corresponds to frame 4 in the upper view, it corresponds to frame 3 in the lower view. That is, the score is computed, while the game advances under the condition that the operation command originally performed in frame 4 is performed in frame 3. When such an error occurs, since it is impossible to accurately reproduce the play and to verify the true score, it is necessary to perform normalization by some method.

Figure 4:
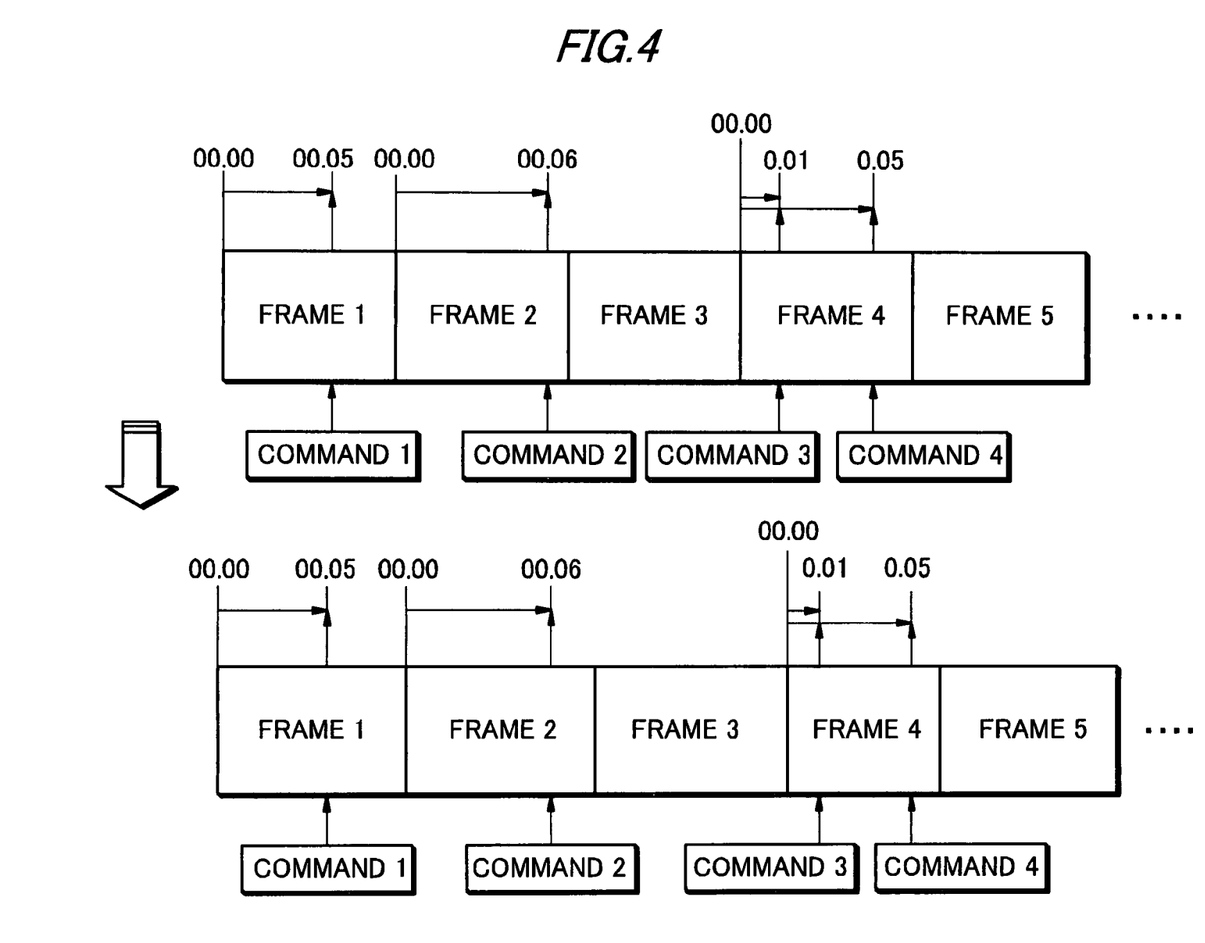
FIG. 4 is a view showing an example where a game is reproduced based upon an operation history recorded while being normalized with reference to a frame.

FIG. 4 shows an example in which the timing of the operation command is normalized relative to the frame, and thereby, the operation history is accurately recorded. In FIG. 4, the upper view shows a relationship between operation commands of the play actually performed by the player terminal 20 and the frames displayed to the player. The lower view shows a relationship between operation commands of the play reproduced by the online game server 10 and the frames displayed.

In the game program according to the score verification system of the preferred embodiment, the reference time period used for recording the history of the operation command is a relative time period from the start of display of each frame and, not an absolute time period from the start of the game. Each operation command is recorded in association with the displayed frame. As shown in the upper view, the operation history at the time of game execution in player terminal 20 is recorded such that the timing when command 1 is executed is 00.05 seconds after the display of frame 1, the timing when command 2 is executed is 00.06 seconds after the display of frame 2, the timing when command 3 is executed is 00.01 seconds after the display of frame 4, and the timing when command 4 is executed is 00.06 seconds after the display of frame 4.

In the case where the play of the player is reproduced in the online game server 10 based upon the operation history recorded as stated above, as shown in the lower view, even if the display timing of the frame is different from that of the play performed in the player terminal 20, an error does not occur in the timing of the operation command in relation to the associated frame. By recording the operation history as stated above, even under different environments, the same play as performed by the player at terminal 20 is reproduced by the server, and the same score can be obtained.

Figure 5:
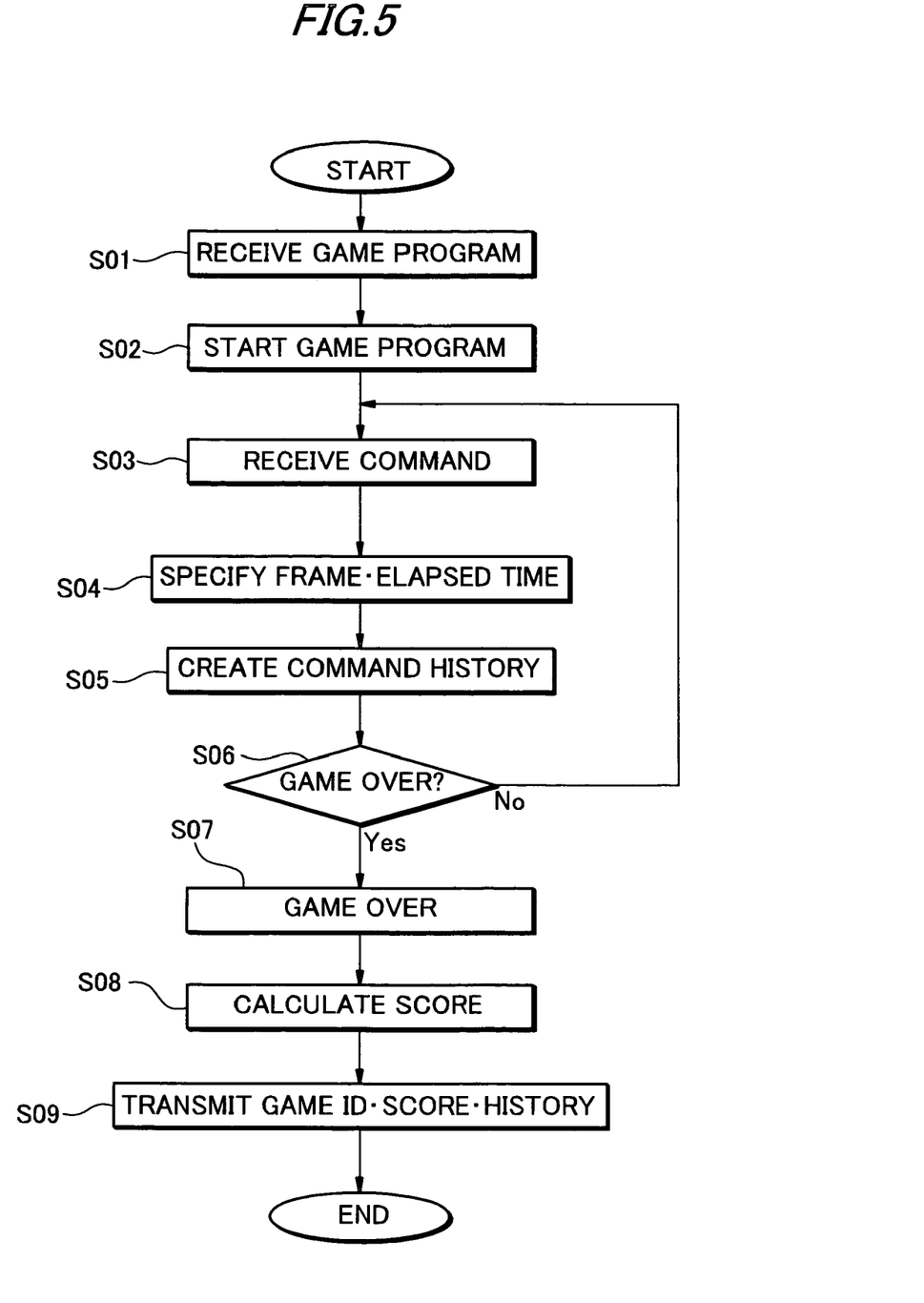
FIG. 5 is a flowchart showing a process of playing a game at a player terminal in the score verification system according to an embodiment of the invention.

An example of a process for playing the game at the player terminal in the score verification system of the preferred embodiment of the invention will be described with reference to flowchart of FIG. 5. Upon receiving the game program from the online game server (S01), the player game terminal starts the game program by a start operation of the player or automatically (S02) to start the online game.

When receiving a command caused by the input operation (depression of a direction key or an execution key, or the like) of the player during the play of the game (S03), the game program specifies the frame being displayed when the command is received and an elapsed time (relative time) from the start of the display of the frame (S04). Then, the game program creates a history of operation commands (S05). This processing is repeated until the game is over (S03 to S06). When the game is over (S06), the game program is ended (S07), and the score acquired by the play is computed (S08). The computed score, together with the game ID specifying the game played and the created history of the operation commands, is transmitted to the online game server (S09), and the processing ends.

Figure 6:
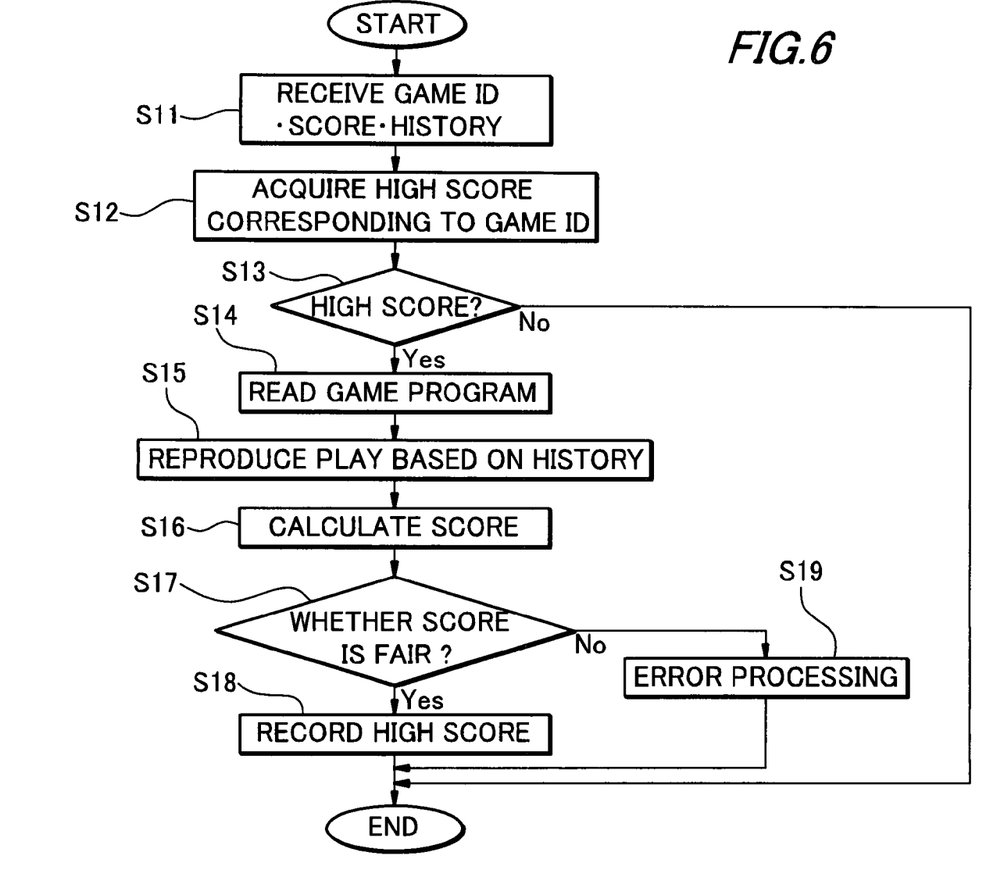
FIG. 6 is a flowchart for verifying the score at an online game server in the score verification system according to an embodiment of the invention.

An example of a process for verifying the score at the online game server in the score verification system according to the preferred embodiment of the invention will be described with reference to the flowchart of FIG. 6. The online game server receives the game ID specifying the game played, the acquired score, and the history of the operation commands of the player from the player terminal in which the game has been over (S11). It is preferable, but not required, that the received information is stored in a secondary storage device such as a database, for example, in order to enable subsequent reproduction.

Next, the high score of a past player corresponding to the received game ID is acquired from the high score storage part (S12). The acquired high score and the score received from the player terminal are compared with each other, and it is judged whether the score received from the player terminal is the score to be ranked in the high score (S13). In the case where it does not fall under the category of high score, the processing ends.

In the case where it falls under the category of high score, the game program corresponding to the received game ID is read (S14), and the game played by the player is reproduced based on the history of the operation commands (S15). The score is computed based upon the result of the reproduced game (S16), and it is judged whether the score is the same as the score received from the player terminal (S17). In the case where the score is the same, it is verified that the received score is the score obtained as a result of actual play of the player. Then, the score received from the player terminal is recorded as the true, unaltered score and as the high score in the high score storage part (S18). In the case where the score is different therefrom, it is judged that the received score is different from the result of actual play of the player, and an error processing is performed (S19). That is, it is not judged whether the received score falls under the category of high score.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure.

This disclosure is intended to cover any and all subsequent adaptations or variations of various embodiments.

What is claimed is:

1. A score verification system for preventing alteration of a score in an online game, comprising:
    a game program storer that stores a game program of the online game with identification information attached thereto for identifying the game program;
    a game transmitter that transmits the game program to a player terminal for playing the online game;
    a game result receiver that receives information relating to a game result from the player terminal, the information including at least the identification information for identifying the game program, a first score calculated based upon an operation of the game program by the player, and an operation history of operation commands of the player;
    a score calculator that reads the game program corresponding to the identification information from the game program storer and executes the operation commands based on the operation history to reproduce the operation of the game program by the player to calculate a second score; and
    a score verifier that compares the first score with the second score to verify whether the first score is a true score,
    wherein the game program records, in the operation history and at a time of receiving each operation command of the player, a frame and a time elapsed from when the frame was displayed by the game program, the frame and the time elapsed being recorded in association with each received operation command of the player, and
    wherein the score calculator reproduces the operation of the game program by the player based upon the frame and the elapsed time recorded in the operation history.

2. The score verification system according to claim 1, further comprising:
    a high score storer that stores information relating to scores of higher-ranking persons with respect to the game program;
    a high score judger that compares the first score with the scores of higher-ranking persons stored by the high score storer to determine whether the first score is within a range of the scores of higher-ranking person; and
    a high score updater that refers to the high score storer in a case where the first score is verified to be the true score, and adds the first score to the scores of higher-ranking persons to update the high score storer when the first score is within range of the scores of higher-ranking persons, and
    wherein the score calculator calculates the second score in a case where the high score judger determines that the first score is within the range of scores of the high-ranking persons.

3. A score verification method for preventing alteration of a score in an online game, comprising:
    reading, by an online game server that manages the online game, a game program of the online game from a game program storage part that stores the game program with identification information attached thereto for identifying the game program and transmitting the game program to a player terminal for playing the online game;
    executing, by the player terminal, the game program and recording an operation history of operation commands of the player;
    calculating, by the player terminal, a first score based upon an operation of the player with respect to the game program;
    transmitting, by the player terminal, information relating to a game result including at least the identification information for identifying the game program, the first score and the operation history to the online game server;
    receiving, by the online game server, information relating to the game result including at least the identification information, the first score and the operation history from the player terminal;
    reading, by the online game server, the game program corresponding to the identification information from the game program storage part, executing the operation commands in accordance with the operation history to reproduce the operation of the player, and calculating a second score based upon the reproduced operation of the player; and
    comparing, by the online game server, the first score with the second score to verify whether the first score is a true score,
    wherein the game program includes recording, in the operation history and at a time of receiving each operation command of the player, a frame and a time elapsed from when the frame was displayed by the game program, the frame and the time elapsed being recorded in association with each received operation command of the player, and
    wherein the operation commands are executed, by the online game server, based upon the frame and the elapsed time recorded in the operation history.

4. The score verification method according to claim 3, further comprising:
   comparing, by the online game server, the first score with scores of higher-ranking persons stored in a high score storage part for storing information relating the scores of the higher-ranking persons to determine whether the first score falls within the range of the scores of higher-ranking persons; and
   referring, by the online game server, to the high score storage part in a case where the first score is verified to be the true score, and adding the first score to the high score storage part when the first score falls within the range of the scores of higher ranking persons, and
   wherein calculating of the second score is executed in a case where it is determined that the first score is within the range of the scores of higher-ranking persons when comparing the first score with the scores of higher-ranking persons.

* * * * *